US007370888B2

(12) United States Patent
Byrne

(10) Patent No.: US 7,370,888 B2
(45) Date of Patent: May 13, 2008

(54) APPARATUS AND METHOD FOR ENHANCING TIRE TRACTION

(75) Inventor: Francis J. Byrne, Medina, OH (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 531 days.

(21) Appl. No.: 10/840,771

(22) Filed: May 6, 2004

(65) Prior Publication Data

US 2005/0248146 A1 Nov. 10, 2005

(51) Int. Cl.
*B62D 25/00* (2006.01)

(52) U.S. Cl. ...................................... 280/851; 239/290

(58) Field of Classification Search ................ 280/851, 280/847, 848, 852; 180/903; 239/289, 290
See application file for complete search history.

(56) References Cited

U.S. PATENT DOCUMENTS 1,486,852 A 3/1924 Barlow
3,086,794 A * 4/1963 Garrett ....................... 280/847
3,182,934 A 5/1965 Clark
3,336,064 A 8/1967 Dzaack
3,339,865 A 9/1967 Nettles
3,544,370 A 12/1970 Wrede
3,680,885 A 8/1972 Decardi et al.
3,779,324 A 12/1973 Kreske, Jr.
3,797,867 A 3/1974 Hartl
3,869,617 A * 3/1975 Gaussoin et al. ........... 280/851
3,874,697 A * 4/1975 Thompson .................. 280/851
4,063,606 A 12/1977 Makinson
4,099,688 A 7/1978 Jayne
4,148,373 A * 4/1979 Cline ......................... 280/851
4,203,423 A 5/1980 Ricci
4,316,625 A 2/1982 Goon et al.
4,378,120 A * 3/1983 Laine ......................... 280/154
4,673,206 A * 6/1987 Kretschmer et al. ..... 296/180.1
4,706,981 A * 11/1987 Dorwart ..................... 280/851
4,834,320 A 5/1989 Tyson
4,848,510 A 7/1989 Ahmed
4,858,941 A * 8/1989 Becker ....................... 280/851
5,074,592 A * 12/1991 White ........................ 280/851
5,100,175 A 3/1992 Swallow et al.
5,118,142 A 6/1992 Bish
5,273,315 A * 12/1993 Debus ........................ 280/762
5,301,996 A 4/1994 Theis
5,350,035 A 9/1994 Bodier et al.
5,555,594 A 9/1996 Maddalena
5,580,106 A 12/1996 Dulberg et al.
6,007,102 A * 12/1999 Helmus ...................... 280/849
6,033,010 A 3/2000 Preiss
6,270,118 B1 8/2001 Ichikawa
6,371,532 B1 4/2002 Skarie et al.

(Continued)

*Primary Examiner*—J. A Shriver
(74) *Attorney, Agent, or Firm*—James A. Oliff; Thomas R. Kingsbury

(57) ABSTRACT

An apparatus and method are provided that utilize a fluid to affect accumulations of water on a road surface in a path of a vehicle. The fluid can be water or an air-water mixture in the environment of the vehicle. A tire is used to gather the fluid. A structure, such as a fender, is disposed adjacent to the tire to focus the fluid that has been gathered by the tire into a spray. The spray is projected ahead of the tire to reduce the depth of, or substantially dissipate, the accumulations of water.

8 Claims, 2 Drawing Sheets

31 1 27 29 7 33 3 13 17 35 5

U.S. PATENT DOCUMENTS 6,488,217 B1 * 12/2002 Donastorg .................. 239/131
6,505,506 B1 1/2003 Hellweg et al.
6,886,862 B2 * 5/2005 Matthew ..................... 280/848
2002/0079707 A1 6/2002 Skarie et al.
2005/0179245 A1 * 8/2005 Hartmann et al. .......... 280/847
2005/0275212 A1 * 12/2005 Angelaitis ................... 280/847

* cited by examiner

APPARATUS AND METHOD FOR ENHANCING TIRE TRACTION

BACKGROUND OF THE INVENTION

1. Field of Invention

The invention relates to tires. In particular, the invention relates to enhancing tire traction, such as in wet and/or slippery conditions, for example.

2. Description of Related Art

Traction determines the performance of tires, including those used in a vehicle, such as a car, truck, van, aircraft, motorcycle, bicycle, or ATV, for example. Tire traction is particularly significant since it is the link between the vehicle and the surface on which the vehicle is traveling, such as a road. Aspects of the vehicle performance that are particularly affected by tire traction include vehicle steering, deceleration and acceleration, for example.

Wet and/or icy road conditions may adversely affect tire traction because such conditions change the coefficient of friction between the tire tread and the road surface. Although the coefficient of friction may be adequate to permit acceptable traction for steering, deceleration and/or acceleration in dry conditions for a given tire, the coefficient of friction may drop when the road becomes wet and/or icy. This drop in the coefficient of friction adversely affects tire and vehicle performance.

A significant drop in the coefficient of friction may cause the tire to slip, such as during steering, acceleration, and/or deceleration, and may even cause the tire to hydroplane. Hydroplaning occurs when water becomes disposed between the vehicle tire and the road surface so that the water pressure raises a portion of the tire off of the pavement. As the vehicle speed increases, the water pressure increases to lift a larger and larger portion of the tire off of the road until the tire is only supported by the water. At this point, all contact between the tire and the road surface is lost, which causes the vehicle to lose control.

The speed at which hydroplaning occurs depends on the tire inflation pressure, water depth on the road surface, the condition of the road surface, and/or the condition of the tire tread. A smooth tire may hydroplane on a road surface when contacting a relatively shallow puddle of water. However, even a tire having a well-defined tread pattern may hydroplane when contacting a puddle of water having a depth greater than the depth of the grooves of the tire tread.

SUMMARY OF THE INVENTION

An apparatus is provided for use with a vehicle that utilizes a fluid in the environment of the vehicle to affect accumulations of water on a surface in a path of the vehicle. The apparatus includes a tire that gathers the fluid. The fluid can include at least one of water and an air-water mixture in the environment of the vehicle. The apparatus also includes a structure disposed adjacent at least a part of the tire that focuses the fluid gathered by the tire into a spray to impact and thereby affect the accumulations of water.

The structure can be a fender of the vehicle. The fender can be disposed 0.1" to 0.3" from the tire. The fender can also be disposed so as to cover at least 20% of the surface of the tire.

A method is also provided for affecting accumulations of water on a surface in a path of a vehicle. The method includes rotating a tire of the vehicle to gather a fluid in the environment of the vehicle. The fluid can include at least one of water and an air-water mixture in the environment of the vehicle. The method also includes focusing the fluid that has been gathered into a spray to impact and thereby affect the accumulations of water.

These and other features and advantages of the invention are described in, or are apparent from, the following detailed description of various exemplary embodiments of the systems and methods according to this invention.

BRIEF DESCRIPTION OF THE DRAWINGS

Various exemplary embodiments of systems and methods according to the invention will be described in detail, with reference to the following figures, wherein.

DETAILED DESCRIPTION OF PREFERRED EMBODIMENTS

Figure 1:
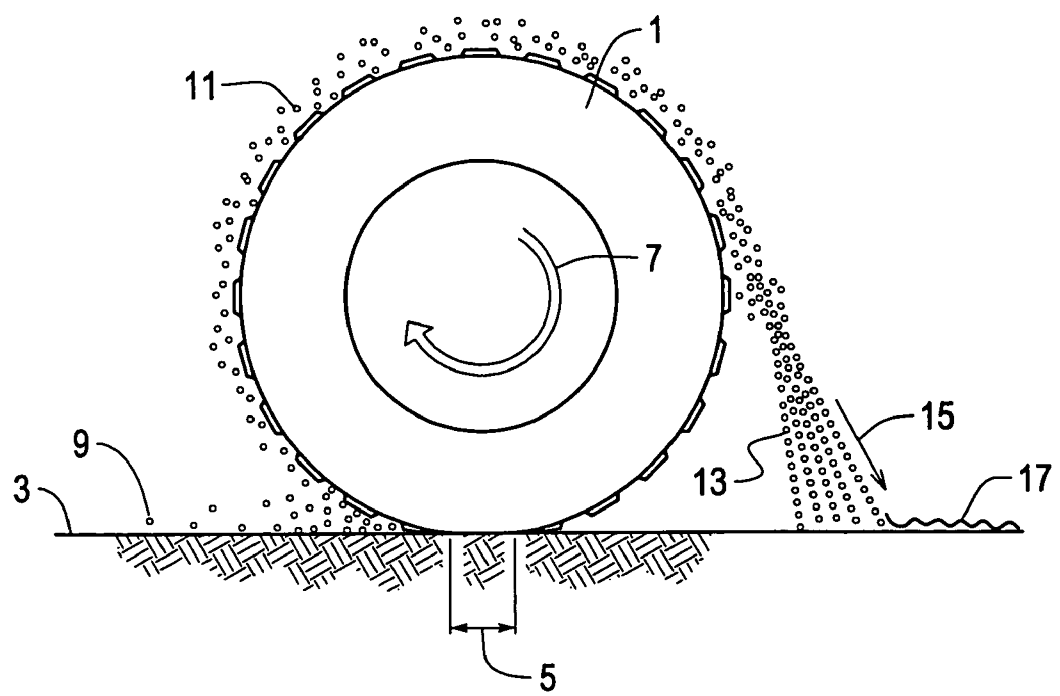
FIG. 1 is a schematic of a rotating tire in accordance with an exemplary embodiment of the invention.

FIG. 1 is a schematic that shows a rotating tire 1 traveling along a road surface 3 in accordance with an exemplary embodiment of the invention. The tire 1 is actually in contact with the road surface 3 via its footprint 5. In FIG. 1, the tire 1 rotates in the direction of arrow 7.

In wet conditions, the rotating tire 1 comes into contact with particles, drops or small accumulations of water 9 disposed on the road surface 3. Upon contact with the tire 1, at least some of the particles, drops or small accumulations of water 11 travel along and/or on the surface of the tire 1 in the direction of rotation 7, to be ejected ahead of the tire in a spray 13 traveling in the direction of arrow 15. The spray 13 traveling in direction 15 impacts accumulations or puddles of water 17 disposed on the road surface 3 in the path of, and ahead of, the rotating tire 1.

If the spray 13 is not sufficiently generated, as in the related art, the tire 1 would ultimately contact the accumulation of water 17 as it travels along its path. This contact with the accumulation of water 17 may cause a drop in the coefficient of friction between the tire 1 and the road surface 3, thereby reducing tire performance and causing the tire 1 to slip, such as during steering, acceleration, or deceleration, or even causing the tire to hydroplane.

However, when a sufficient spray 13 does impact the accumulation of water 17, the resultant force reduces the depth of or dissipates the accumulation 17. Thus, the footprint 5 of the tire 1 is not subjected to the accumulation of water 17, or is subject to a reduced amount of water, thereby increasing the surface area of the footprint 5 of the tire tread in contact with the road surface 3, which enhances tire performance. For example, increasing the amount of contact between the outside shoulder of the tire tread and the road surface 3 may enhance steering control, and increasing the amount of contact between the center of the tire tread and the road surface 3 may enhance acceleration and/or deceleration.

In the exemplary embodiment discussed above, the spray 13 is formed of particles, drops or small accumulations of water. However, the spray can be formed of anything in the environment of the rotating tire or vehicle. For example, the spray 13 can be formed of air or an air-water mixture.

Figure 2:
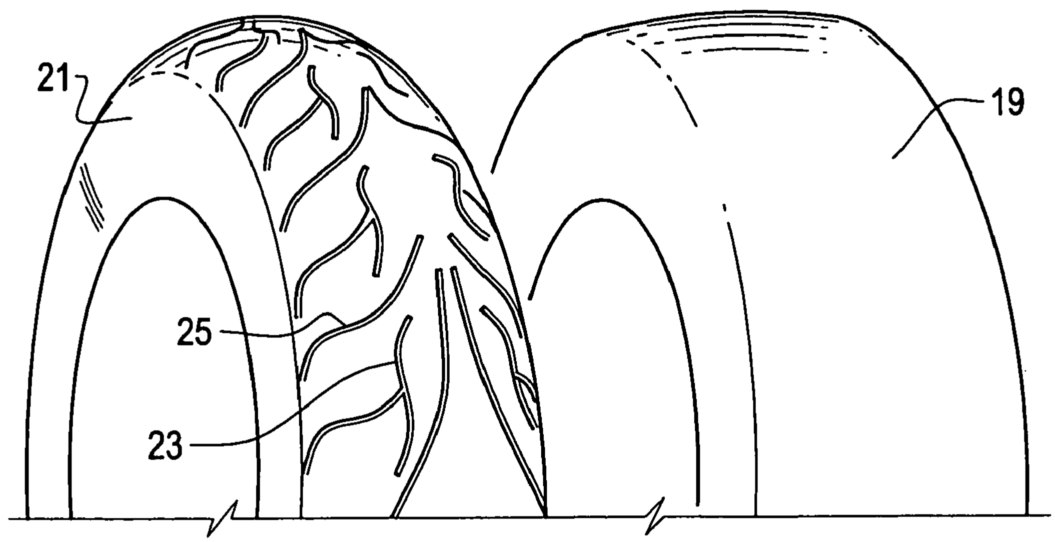
FIG. 2 is a schematic of a tire having a smooth tread and a tire having a tread pattern defining a lateral component.

Many tire tread designs and patterns can be used in accordance with the invention. For example, a tire 19 having a smooth or substantially smooth tread pattern is shown in FIG. 2. This smooth pattern may perform particularly well in dry conditions by virtue of the increased surface area of the tire tread in contact with the road surface.

However, in accordance with the invention, it is particularly advantageous to use a tire having a tread pattern that is able to direct a relatively great amount of water or air-water mixture (hereinafter "fluid") into the spray 13. This is particularly advantageous since increasing the amount of fluid directed into the spray 13 increases the force imparted to the accumulation of water 17 in front of the tire.

For example, a tire 21 having a tread pattern that may be particularly advantageous is shown in FIG. 2. This tread pattern includes both substantially circumferentially extending grooves 23 as well as substantially laterally extending grooves 25. The laterally extending grooves 25 may be particularly effective in catching and/or directing the fluid into the spray 13. Specifically, the laterally extending grooves 25 may enable an enhanced or optimized amount of the fluid existing in the environment of the tire 1 to be directed into the spray 13. An all season tread pattern may also be particularly effective.

However, any tread design that catches and directs a sufficient amount of fluid into the spray can be used. This flexibility in tread design is particularly advantageous over the related art, wherein tread patterns having a high "pattern void" and high "see through" are necessary to provide traction in wet conditions and to address hydroplaning. In the related art, "pattern void" is defined as the amount of open space or "void" in a tire tread, such as the open space defined by channels and/or sipes, and "see through" is defined as the open space in the portion of the tire tread which touches the road surface, also known as the "footprint."

The related art tread designs provide traction in wet conditions and address hydroplaning via high "pattern void" and high "see through," such as 40%, for example, since the increased volume of open space is intended to enable the tire to process the water in such a way as to maintain contact between a portion of the tire tread and the road surface. For example, when such a related art tire contacts an accumulation of water, volumes of the water are directed into the relatively large volume channels, enabling the outer surfaces of the tread defined between the channels, such as lands, to maintain contact with the road surface. This is contrasted with a smooth tire having a relatively low "pattern void" and low "see through" which is not able to effectively process a significant volume of water. Thus, a smooth tire that encounters a relatively shallow accumulation of water will become entirely supported by the water and lose all contact with the road surface, resulting in hydroplaning and loss of control. For example, tire 19 (shown in FIG. 2) would be much more likely to lose all contact with the road surface upon encountering a relatively shallow accumulation of water than tire 21.

The flexibility in tread design provided by virtue of utilizing a spray to address accumulations of water, as opposed to having to rely on high "pattern void" and high "see through" tread patterns, is an advantage of the invention. For example, because the tire tread of the invention does not need to have a high "pattern void" and high "see through," it can be designed to address other design constraints, such as handling in dry conditions, for example. Performance in dry conditions is typically enhanced by increasing the amount of tread surface in contact with the road. The large channels which provide the high "pattern void" and high "see through" only leave relatively small land portions to contact the road surface, which negatively affects performance in dry conditions. However, the invention can utilize a smoother tire which performs better in dry conditions.

Figure 3:
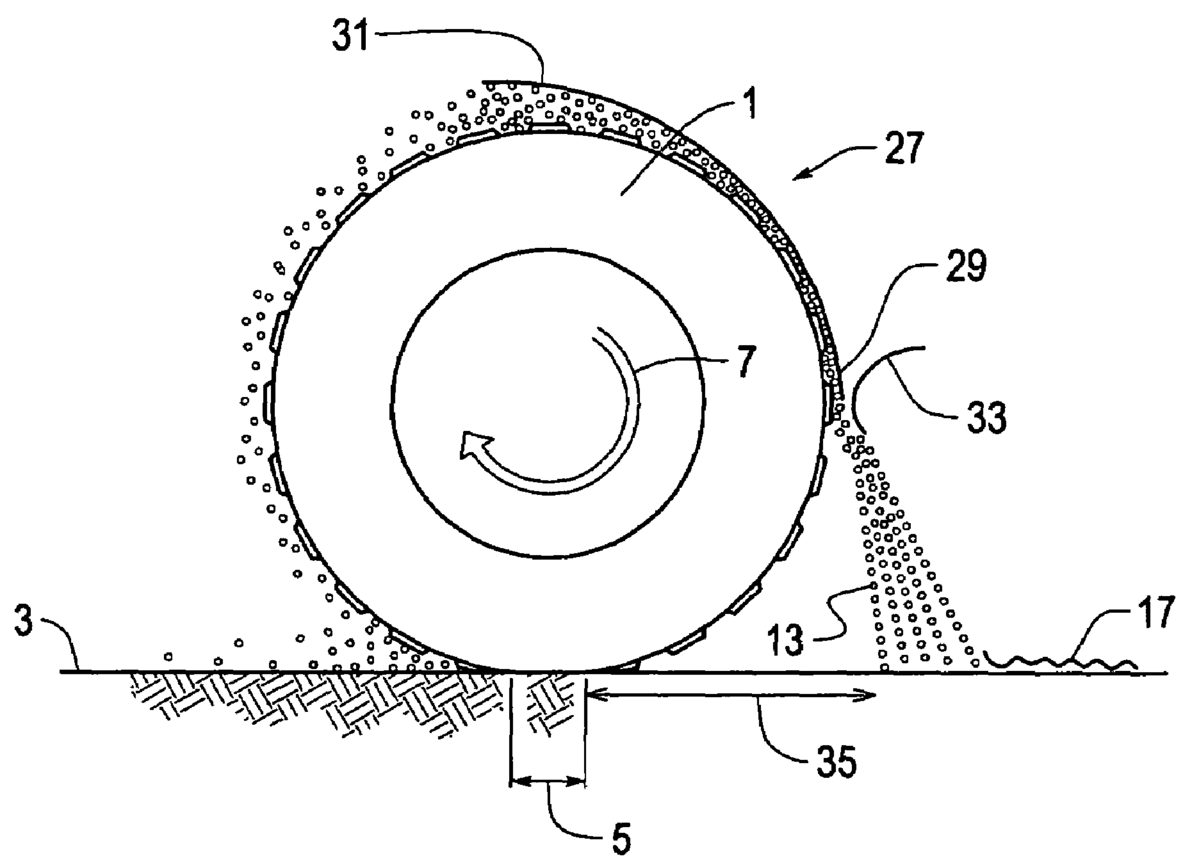
FIG. 3 is a schematic of a rotating tire and fender in accordance with an exemplary embodiment of the invention.

The tire 1 can also be used in conjunction with an additional structure to further focus the spray 13 of fluid in front of the tire. For example, as shown in FIG. 3, a fender 27 can be used to enhance the spraying effect. The fender 27 may focus or direct the fluid provided to it by the tire 1 into the spray 13. Thus, the fender 27 can operate as a pump to accelerate the fluid around the tire 1 and into the spray 13.

The fender 27 can also be specifically disposed and/or structured so as to further enhance the spraying effect, such as to increase the amount of fluid directed into the spray 13, or to increase the velocity and/or pressure of the spray 13. For example, in an exemplary embodiment, the fender is disposed 0.1" to 3" from the tread surface of the tire. Disposing the fender 27 close to the tread surface increases the pressure and/or velocity of the spray 13. Also, the front portion 29 of the fender 27 can be disposed closer to the tread surface of the rotating tire 1 than the rear portion 31. This may create a nozzle effect, increasing the velocity and/or pressure of the spray 13, and thereby providing an enhanced effect on the accumulation of water 17. Specifically, increasing the velocity and/or pressure of the spray 13 may further reduce the depth of the accumulation of water 17, or may shorten the time to dissipate the accumulation of water 17 subsequent to impact.

The fender 27 can also be disposed so as to cover a certain percentage of the tread surface of the tire 1. Increasing the coverage provided by the fender 27 may increase the amount of fluid directed into the spray 13. As discussed above, this is advantageous since increasing the amount of fluid directed into the spray 13 increases the force imparted to the accumulations of water 17 in front of the tire 1. In the exemplary embodiment shown in FIG. 3, at least 20% of the tread surface of the tire 1 is covered by the fender 27.

However, the fender 27 is not limited to the structures shown in FIG. 3 and discussed above. The fender 27 can have any shape or disposition that enables the spray 13 to have an enhanced effect upon the accumulation of water 17. For example, the fender 27 can cover the entire width of the tire 1 or only part of the width of the tire 1. The fender 27 can even extend beyond the width of the tire 1. However, it may be preferable that the fender 27 not extend beyond 120% of the width of the tire 1. Also, for example, the fender 27 can define a uniform surface, or alternatively be defined by strips or bands.

An additional structure may also be included downstream of the fender 27. For example, as shown in FIG. 3, a spray end 33 may be disposed downstream of the front portion 29 of the fender 27 to further direct the spray 13 or to enhance other characteristics of the spray 13.

The fender 27 and/or the spray end 33 may also be structured or disposed so as to increase the distance that the spray 13 extends from the front of the tire 1. For example, as shown in FIG. 3, the spray 13 extends a distance from the front of the footprint 5 of the tire 1 indicated by arrow 35. Increasing this distance 35 enables accumulations of water 17 that are disposed a greater distance ahead of the tire 1 to be reduced in depth or dissipated, which provides the advantage of increasing the amount of time available to reduce the depth of or dissipate the accumulations 17. In other words, increasing the distance 35 of the spray 13 yields a higher time differential between the time when the spray first impacts the accumulation of water 17 and the time when the tire 1 contacts the portion of the road surface 3 or which the accumulation of water is, or was, disposed.

Increasing this time differential provides the advantage of reducing the amount of force that the spray 13 needs to impart onto the accumulation of water 17 to sufficiently reduce the depth of or dissipate the accumulation 17 prior to contact with the tread of the tire 1. Thus, a spray 13 having a reduced volume, velocity or pressure can be used to achieve the requisite reduction in depth or dissipation of the accumulation of water 17.

Utilizing the fender 27 and/or spray end 33 enables other tread patterns to be used to generate the spray 13. This flexibility in tread design is particularly advantageous over the related art which uses high "pattern void" and high "see through" tread patterns to combat hydroplaning. For example, because the tire tread of the invention does not need to have a high "pattern void" and high "see through," it can be designed to address other design constraints, such as handling in dry conditions, for example. Also, since tire treads having a high "see through" tend to generate a lot of noise as the tire rotates, the tread design in accordance with the invention can be designed to reduce noise, for example.

Utilizing the fender 27 and/or spray end 33 may also enable tires 1 to be used longer. For example, the performance of related art tires with regard to traction control in water decreases significantly as they become worn, since they rely on high "pattern void" and high "see through." However, the performance of the invention in reducing the depth of or dissipating accumulations of water 17 is not dramatically negatively impacted in this manner as the tire tread becomes worn since the fender 27 and/or spray end 33 enhance the effect of the spray 13.

It may also be advantageous to attach the fender 27 and/or spray end 33 to the suspension side of the vehicle. This would enable the fender 27 and/or spray end 33 to move with the tire 1 so as not to contact the tire 1 when the vehicle encounters bumps in the road, for example.

It is also an advantage of the invention that the reduction in depth or dissipation of the accumulations of water 17 is enhanced as the vehicle travels faster. Specifically, the volume, pressure and/or velocity of the spray 13 increases as the tire 1 rotational speed increases. This is particularly advantageous since hydroplaning is more likely to occur as the vehicle speed increases.

Various changes can be made to the exemplary embodiments discussed above without departing from the scope of the invention. For example, while the invention has been described in the context of a tire for a vehicle, it can be used in any other application that is completely different from tires or vehicles. Also, although the above exemplary embodiments generate the spray via the tire and/or fender, the invention is not limited to this structure. For example, the invention is intended to cover any apparatus or method of generating and projecting the spray to affect accumulations of water in the path of, and ahead of, the tires. Further, all of the elements of the invention can be manufactured in any manner or formed of any acceptable material.

While the systems and methods of this invention have been described in conjunction with the specific exemplary embodiments outlined above, it is evident that many other alternatives, modifications and variations will be apparent to those skilled in the art. Accordingly, the exemplary embodiments of the systems and methods of the invention, as set forth above, are intended to be illustrative, not limiting. Various changes may be made without departing from the spirit and scope of the invention.

What is claimed is:

1. An apparatus for use with a vehicle that utilizes a fluid in the environment of the vehicle to affect accumulations of water on a surface in a oath of the vehicle, the apparatus comprising:

- a tire that gathers the fluid; and
- a structure disposed adjacent at least a part of the tire that focuses the fluid gathered by the tire into a spray to impact and thereby affect the accumulations of water ahead of the tire;
- the structure including a fender of the vehicle;
- the fender including a front portion and a rear portion, the front portion being disposed closer to the tire than the rear portion.

2. The apparatus according to claim 1, the fender being disposed 1" to 3" from the tire.

3. The apparatus according to claim 1, the fender being disposed so as to cover at least 20% of the surface of the tire.

4. The apparatus according to claim 1, the tire defining at least one groove that includes a lateral component.

5. The apparatus according to claim 1, the structure being disposed such that the spray impacts the accumulations of water to reduce a depth of, or substantially dissipate, the accumulations of water to enhance traction of the tire.

6. The apparatus according to claim 1, the fluid including at least one of water and an air-water mixture in the environment of the vehicle.

7. An apparatus for use with a vehicle that utilizes a fluid in the environment of the vehicle to affect accumulations of water on a surface in a oath of the vehicle, the apparatus comprising:

- a tire that gathers the fluid; and
- a structure disposed adjacent at least a part of the tire that focuses the fluid gathered by the tire into a spray to impact and thereby affect the accumulations of water ahead of the tire;
- the structure including a fender of the vehicle;
- the structure further including a spray end that further focuses the spray provided by the fender;
- a front portion of the fender being disposed closer to the tire than the spray end.

8. An apparatus for use with a vehicle that utilizes a fluid in the environment of the vehicle to affect accumulations of water on a surface in a oath of the vehicle, the apparatus comprising;

- a tire that gathers the fluid; and
- a structure disposed adjacent at least a part of the tire that focuses the fluid gathered by the tire into a spray to impact and thereby affect the accumulations of water ahead of the tire;
- the structure including a fender of the vehicle;
- the fender being attached to a suspension side of the vehicle such that the fender is movable with the tire.

* * * * *